United States Patent
Kaiser (10) Patent No.: US 7,406,457 B2
(45) Date of Patent: Jul. 29, 2008

(54) DYNAMIC SAMPLE DATA SWITCH

(75) Inventor: Martin Kaiser, Speyer (DE)

(73) Assignee: SAP AG, Walldorf (DE)

( * ) Notice: Subject to any disclaimer, the term of this patent is extended or adjusted under 35 U.S.C. 154(b) by 198 days.

(21) Appl. No.: 10/956,191

(22) Filed: Sep. 30, 2004

(65) Prior Publication Data

US 2006/0074914 A1   Apr. 6, 2006

(51) Int. Cl.
*G06F 13/14*   (2006.01)
*G06F 12/00*   (2006.01)

(52) U.S. Cl. .............................. 707/2; 710/316; 711/154

(58) Field of Classification Search ................ 707/1–10, 707/201–202; 717/124–135
See application file for complete search history.

(56) References Cited

U.S. PATENT DOCUMENTS

| | | | | |
|---|---|---|---|---|
| 5,561,763 A | * | 10/1996 | Eto et al. ....................... | 714/35 |
| 5,642,504 A | * | 6/1997 | Shiga ........................... | 707/10 |
| 5,675,785 A | * | 10/1997 | Hall et al. ..................... | 707/102 |
| 5,920,858 A | * | 7/1999 | Kitabayashi et al. ........... | 707/4 |
| 5,930,791 A | * | 7/1999 | Leu ............................... | 707/8 |
| 5,956,730 A | * | 9/1999 | Burroughs et al. ........... | 707/104.1 |
| 6,125,442 A | * | 9/2000 | Maves et al. ................. | 712/220 |
| 6,134,549 A | * | 10/2000 | Regnier et al. ................ | 707/9 |
| 6,192,375 B1 | | 2/2001 | Gross | |
| 6,199,069 B1 | | 3/2001 | Dettinger et al. | |
| 6,233,584 B1 | * | 5/2001 | Purcell ..................... | 707/103 X |
| 6,401,087 B2 | * | 6/2002 | Yanagimoto ................... | 707/5 |
| 7,024,420 B2 | | 4/2006 | Ball et al. | |
| 7,054,865 B2 | * | 5/2006 | Kato et al. .................... | 707/10 |

OTHER PUBLICATIONS

IBM Technical Disclosure Bulletin, "Mapping a Relational Database to a Hierarchical File System," vol. 38, No. 10, pp. 309-311, Oct. 1995.*

* cited by examiner

*Primary Examiner*—Gary J Portka
(74) *Attorney, Agent, or Firm*—Kenyon & Kenyon LLP (57) ABSTRACT

A technique for preventing modification of productive data in a database. In response to a database access request in a productive data database access configuration, a database interface facilitates access to a sample database when a sample switch is enabled. The database interface facilitates normal database access when the sample switch is disabled.

11 Claims, 6 Drawing Sheets

DYNAMIC SAMPLE DATA SWITCH

BACKGROUND

It is common to test a database, or a system or program associated with the database, by accessing sample data in the database. However, when productive databases are tested or used to test a program, productive data may be retrieved or modified. This may have undesirable consequences. For example, a company that maintains the database may worry about retrieval of productive data for testing purposes out of security or privacy concerns. Moreover, the company may not want sample data read out during normal use of the database. Plus, as a common sense rule, it is simply unwise to risk modification of productive data for the purposes of testing.

BRIEF DESCRIPTION OF THE DRAWINGS

Embodiments of the invention are illustrated in the figures. However, the embodiments and figures are illustrative rather than limiting; they provide examples of the invention. The invention is limited only by the claims.

DETAILED DESCRIPTION OF THE PREFERRED EMBODIMENTS

A technique for facilitating access to dynamically available sample data involves setting an environment variable or switch to enable access to sample data, receiving a request for a database interface, and producing a database interface with access to sample data in accordance with the environment variable. The database interface may redirect database access requests toward the sample data. A system developed according to this technique may include a sample switch that may be set to enabled or disabled and an object factory configured to instantiate a database interface in response to a database access request. The database access request may have a productive data database access configuration. The database interface facilitates making a database query in a sample data database access configuration if the sample switch is enabled, and in the productive data database access configuration if the sample switch is disabled. In operation, the system facilitates receiving a database access request in a productive data database access configuration, providing a database interface, and making, through the database interface, a database query in a sample data database access configuration if the sample switch is enabled. If the sample switch is disabled then the system facilitates making, through the database interface, a database query in a productive data database access configuration.

Figure 1:
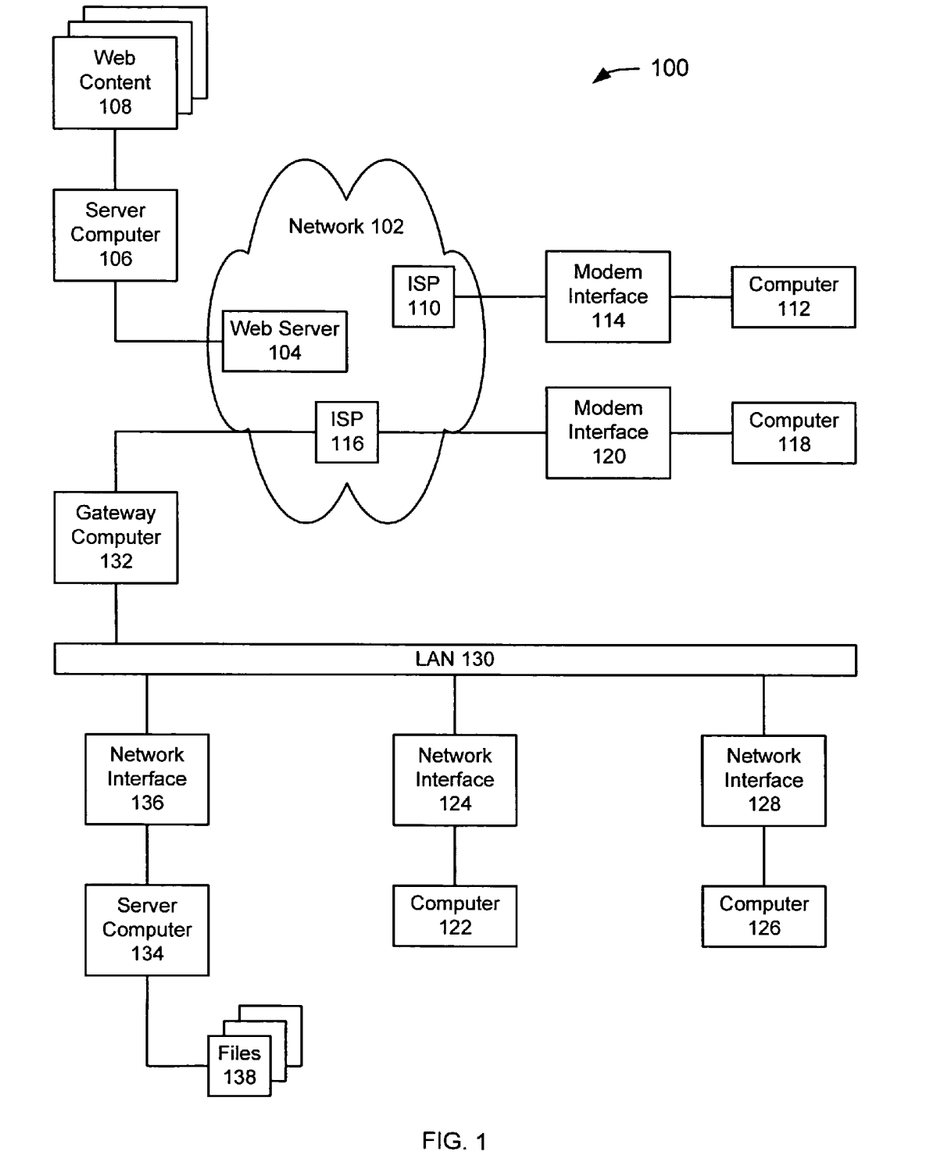
FIG. 1 depicts a networked system for use in an embodiment.
Figure 2:
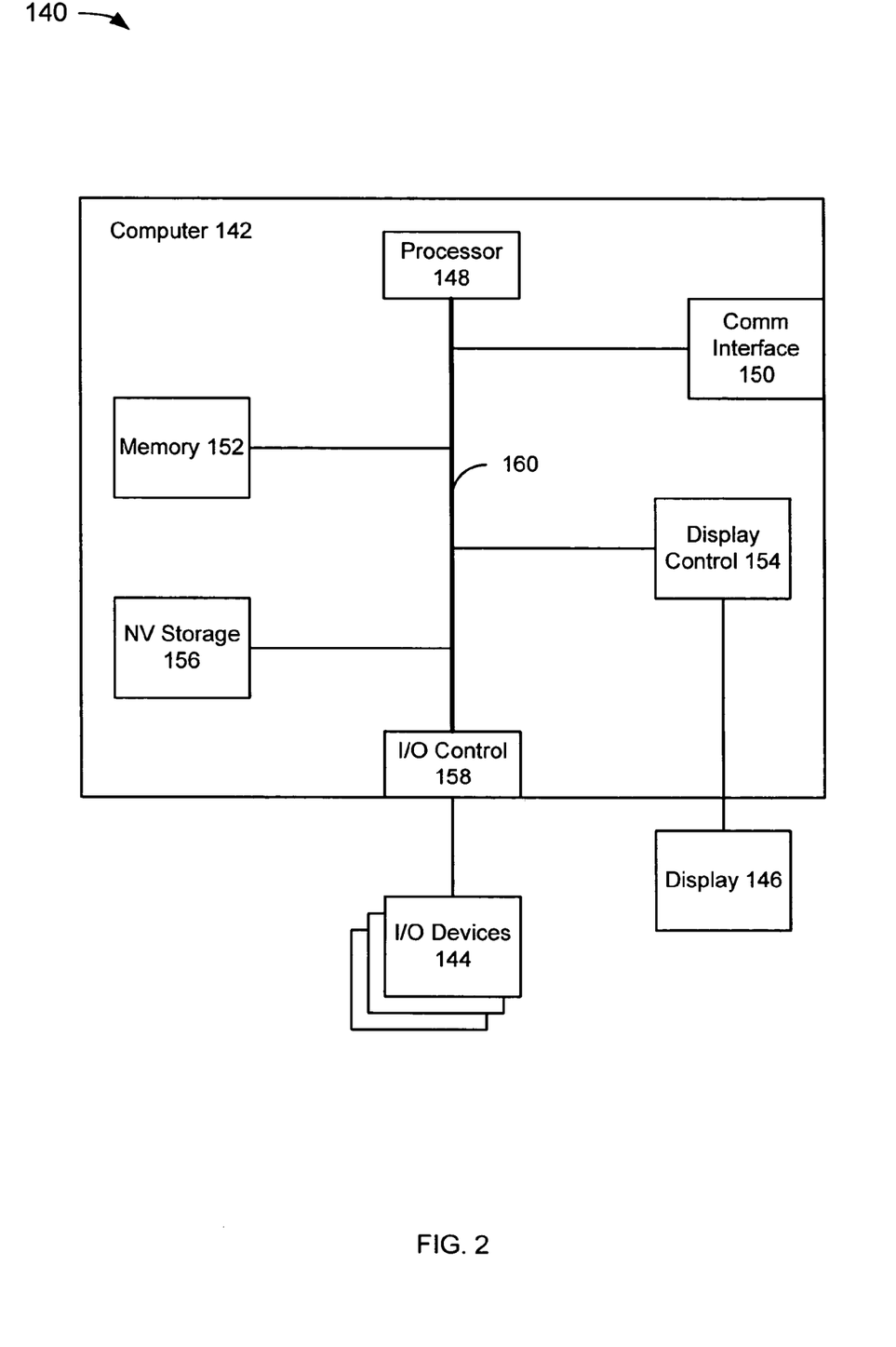
FIG. 2 depicts a computer system for use in the system of FIG. 1.

The following description of FIGS. 1 and 2 is intended to provide an overview of computer hardware and other operating components suitable for performing the methods of the invention described herein, but is not intended to limit the applicable environments. Similarly, the computer hardware and other operating components may be suitable as part of the apparatuses of the invention described herein. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 1 depicts a networked system 100 that includes several computer systems coupled together through a network 102, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

The web server 104 is typically at least one computer system which operates as a server computer system and is configured to operate with the protocols of the world wide web and is coupled to the Internet. The web server system 104 can be a conventional server computer system. Optionally, the web server 104 can be part of an ISP which provides access to the Internet for client systems. The web server 104 is shown coupled to the server computer system 106 which itself is coupled to web content 108, which can be considered a form of a media database. While two computer systems 104 and 106 are shown in FIG. 1, the web server system 104 and the server computer system 106 can be one computer system having different software components providing the web server functionality and the server functionality provided by the server computer system 106, which will be described further below.

Access to the network 102 is typically provided by Internet service providers (ISPs), such as the ISPs 110 and 116. Users on client systems, such as client computer systems 112, 118, 122, and 126 obtain access to the Internet through the ISPs 110 and 116. Access to the Internet allows users of the client computer systems to exchange information, receive and send e-mails, and view documents, such as documents which have been prepared in the HTML format. These documents are often provided by web servers, such as web server 104, which are referred to as being "on" the Internet. Often these web servers are provided by the ISPs, such as ISP 110, although a computer system can be set up and connected to the Internet without that system also being an ISP.

Client computer systems 112, 118, 122, and 126 can each, with the appropriate web browsing software, view HTML pages provided by the web server 104. The ISP 110 provides Internet connectivity to the client computer system 112 through the modem interface 114, which can be considered part of the client computer system 112. The client computer system can be a personal computer system, a network computer, a web TV system, or other computer system. While FIG. 1 shows the modem interface 114 generically as a "modem," the interface can be an analog modem, isdn modem, cable modem, satellite transmission interface (e.g. "direct PC"), or other interface for coupling a computer system to other computer systems.

Similar to the ISP 114, the ISP 116 provides Internet connectivity for client systems 118, 122, and 126, although as shown in FIG. 1, the connections are not the same for these three computer systems. Client computer system 118 is coupled through a modem interface 120 while client computer systems 122 and 126 are part of a LAN 130.

Client computer systems 122 and 126 are coupled to the LAN 130 through network interfaces 124 and 128, which can be ethernet network or other network interfaces. The LAN 130 is also coupled to a gateway computer system 132 which can provide firewall and other Internet-related services for the local area network. This gateway computer system 132 is coupled to the ISP 116 to provide Internet connectivity to the client computer systems 122 and 126. The gateway computer system 132 can be a conventional server computer system.

Alternatively, a server computer system 134 can be directly coupled to the LAN 130 through a network interface 136 to provide files 138 and other services to the clients 122 and 126, without the need to connect to the Internet through the gateway system 132.

FIG. 2 depicts a computer system 140 for use in the system 100 (FIG. 1). The computer system 140 may be a conventional computer system that can be used as a client computer system or a server computer system or as a web server system. Such a computer system can be used to perform many of the functions of an Internet service provider, such as ISP 110 (FIG. 1). The computer system 140 includes a computer 142, I/O devices 144, and a display device 146. The computer 142 includes a processor 148, a communications interface 150, memory 152, display controller 154, non-volatile storage 156, and I/O controller 158. The computer system 140 may be couple to or include the I/O devices 144 and display device 146.

The computer 142 interfaces to external systems through the communications interface 150, which may include a modem or network interface. It will be appreciated that the communications interface 150 can be considered to be part of the computer system 140 or a part of the computer 142. The communications interface can be an analog modem, isdn modem, cable modem, token ring interface, satellite transmission interface (e.g. "direct PC"), or other interfaces for coupling a computer system to other computer systems.

The processor 148 may be, for example, a conventional microprocessor such as an INTEL PENTIUM microprocessor or MOTOROLA POWERPC microprocessor. The memory 152 is coupled to the processor 148 by a bus 160. The memory 152 can be dynamic random access memory (dram) and can also include static ram (sram). The bus 160 couples the processor 148 to the memory 152, also to the non-volatile storage 156, to the display controller 154, and to the I/O controller 158.

The I/O devices 144 can include a keyboard, disk drives, printers, a scanner, and other input and output devices, including a mouse or other pointing device. The display controller 154 may control in the conventional manner a display on the display device 146, which can be, for example, a cathode ray tube (CRT) or liquid crystal display (LCD). The display controller 154 and the I/O controller 158 can be implemented with conventional well known technology.

The non-volatile storage 156 is often a magnetic hard disk, an optical disk, or another form of storage for large amounts of data. Some of this data is often written, by a direct memory access process, into memory 152 during execution of software in the computer 142. One of skill in the art will immediately recognize that the terms "machine-readable medium" or "computer-readable medium" includes any type of storage device that is accessible by the processor 148 and also encompasses a carrier wave that encodes a data signal.

The computer system 140 is one example of many possible computer systems which have different architectures. For example, personal computers based on an INTEL microprocessor often have multiple buses, one of which can be an I/O bus for the peripherals and one that directly connects the processor 148 and the memory 152 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 152 for execution by the processor 148. A Web TV system, which is known in the art, is also considered to be a computer system according to the present invention, but it may lack some of the features shown in FIG. 2, such as certain input or output devices. A typical computer system will usually include at least a processor, memory, and a bus coupling the memory to the processor.

In addition, the computer system 140 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of operating system software with its associated file management system software is the LINUX operating system and its associated file management system. The file management system is typically stored in the non-volatile storage 156 and causes the processor 148 to execute the various acts required by the operating system to input and output data and to store data in memory, including storing files on the non-volatile storage 156.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-roms, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the present invention is not described with reference to any particular programming language, and various embodiments may thus be implemented using a variety of programming languages.

Figure 3:
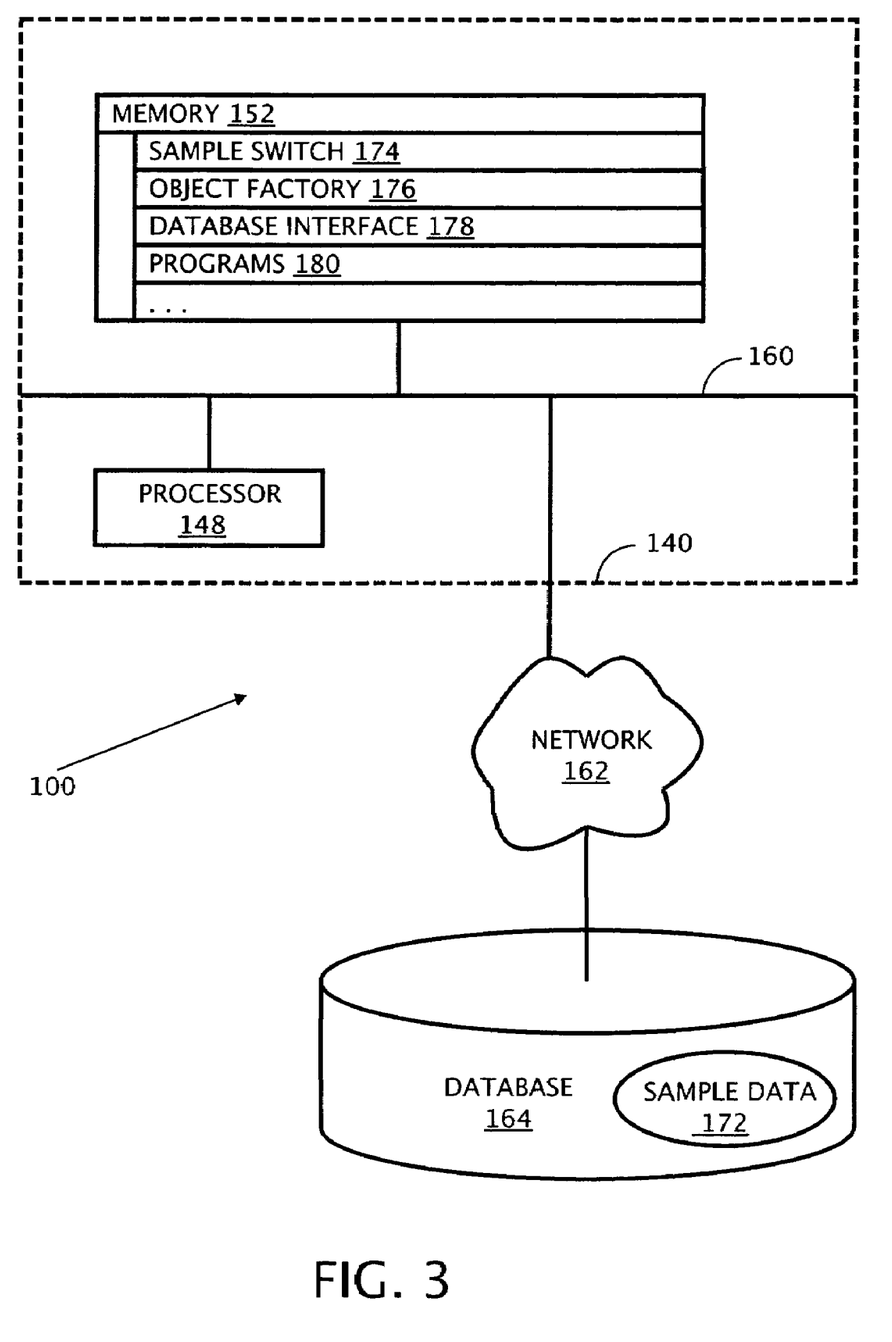
FIG. 3 depicts a portion of the computer system of FIG. 2 and components of the system of FIG. 1.

FIG. 3 depicts a portion of the computer system 140 (FIG. 2) and components of the system 100 (FIG. 1). FIG. 3 depicts the computer system 140, a network 162, and a database 164. The network 162 could be a global information network, such as the Internet, a local or wide area network (LAN or WAN), or some other intranet or network. For example, the network 102 (FIG. 1) could include the network 162. Alternatively, the LAN 130 (FIG. 1) could include the network 162.

The database 164 may be stored in non-volatile storage coupled to and accessible through the network 162. The database could be part of a computer system, such as the computer system 140 (FIG. 2). The database could be served as Web content, such as by the server computer 106 (FIG. 1). The database could be part of a server computer on a LAN or WAN, such as the server computer 134 (FIG. 1). The database 164 is typically accessible through the network 162 by other remote computers. The database 164 includes sample data 172. Other data in the database 164 may be referred to as productive data, since it may include data that is used in the normal course of business. The sample data and productive data may be referred to collectively as data in the database 164. Alternatively, the sample data may be referred to as data in a sample database and the productive data may be referred to as data in a productive database. In an embodiment, sample data may be distinguished from productive data by using a state field that can be set to indicate whether the data is sample data. In an alternative embodiment, the sample data may be distinguishable by using some other marking, sorting, or identifying technique. Thus, the sample data 172 may be logically distinct from the productive data, without being physically separated.

Figure 4:
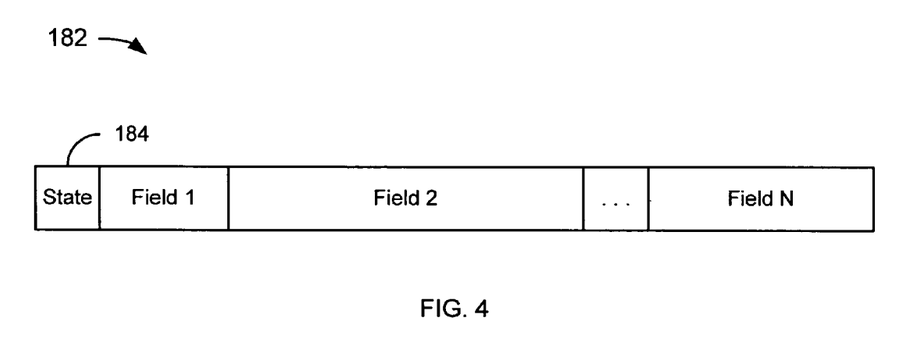
FIG. 4 depicts an exemplary database entry for use with the database of FIG. 3.

The database 164 includes database entries. FIG. 4 depicts an exemplary database entry 182. For the purposes of example, the database entry 182 includes a state field 184 and fields 1 to N. The fields may contain data such as text, numbers, flags, and the like, as is well-known in the field of databases. The state field 184 may contain a value that indicates the state of the data associated with the database entry 182. For example, when a database query for active data is received, the state field 184 may be checked to determine whether the database entry 182 is associated with active data. In an exemplary embodiment, the state field 184 may include the value 'A', to indicate the database entry 182 is active. Instead, the state field 184 may include the value 'I' to indicate the database entry 182 is inactive. Inactive data may be data that is has been modified by a user but not yet released, data that needs to be double-checked, or some other data that is not activated for general access to users of the database 164. The state field 184 may or may not have other valid values associated with it. One such value may be 'S' to indicate sample data. Alternatively, the values 'a' and 'i' could be used to indicate sample data that is treated as active or inactive, respectively.

It should be noted that the state field 184 may have more valid values that would be set by applications that access the database 164. For example, an application that knows of two valid states (e.g., active or inactive) may generate a query that includes, for example, an active state or an inactive state. The application in this example would not generate a query that includes a sample state (because it does not know that a sample state is a valid state). In an embodiment, the state is changed by, for example, the database interface 178, according to the sample switch 174. For example, the database interface 178 may adjust the query to include a sample state instead of an active state. In this way, the application that originated the query may access sample data without any adjustment to inform the application that a sample state is valid. This can be advantageous when it is expensive or otherwise undesirable to make changes to an application to enable sample states for testing or demonstration purposes.

Similarly, the database entries themselves need not have additional fields added to incorporate a sample database. The state field 184 (for example, or another field with like characteristics) assuming it already exists in the database, can simply include a different value (e.g., 'S' for sample). Accordingly, the database need not be reconfigured, copied, or otherwise modified. Sample data is simply written, modified, or deleted without any changes to the productive data in the database, if any. Nevertheless, advantageously, the sample data and productive data are distinguishable such that productive data is not modified during testing or demo and sample data is not accessed when queries for productive data are made.

Referring once again to FIG. 3, the computer system 140 includes a processor 148, a memory 168, and a bus 160 that couples the processor 148 to the memory 168. The memory 168 may include both volatile memory, such as DRAM or SRAM, and non-volatile memory, such as magnetic or optical storage. The processor 148 executes code in the memory 168. The memory 168 includes a sample switch 174, an object factory 176, a database interface 178, and programs 180.

The object factory 176 instantiates the database interface 178. The database interface 178 may be an object or some other software or firmware data structure. The database interface 178 may or may not include static sample data (not shown).

The programs 180 access the database 164 through the database interface 178. In an alternative embodiment, a database interface may be instantiated for each of the programs 180, for a subset of the programs 180, or for all of the programs 180. The subset of the programs 180 that utilize the same database interface 178 may be, for example, those programs that are used by a particular user. Requests for sample data may include an identifiable flag or other value that identifies the request as associated with sample data. The flag may be set by the program generating the request, by the database interface 178, by an environment variable, by the user, or by some other mechanism for identifying requests as associated with sample data.

In an embodiment, access to the database 164 through the database interface 178 is in the form of a database query from, for example, one of the programs 180. The query may include values that are compared to various fields of database entries in the database 164. A database query may include one or more values that are matched to one or more fields to identify an entry. The values may be included in a database query generated by, for example, one of the programs 180. Database queries are well-understood in the field of databases so a more detailed description of database queries is deemed unnecessary.

The sample switch 174 may be an environment variable, a user-dependent environment variable, an object stored in volatile or non-volatile memory that acts like an environment variable, or stored in a server configuration, in a database table or some other medium. Alternatively, the sample switch 174 may be enabled according to a value of an environment variable (not shown). The sample switch 174 may or may not be included in the database interface 178. In an embodiment, a database query may include a state flag. If the sample switch 174 is enabled, then the state flag may be changed to include sample data. For example, if a database query includes a state flag that is set to 'A' (associated with active data), but the sample switch 174 is enabled, then the database interface 178 may change the state flag from 'A' to 'S' (associated with sample data).

The sample switch 174 may have multiple settings. For example, the sample switch 174 may have one disabled setting and two enabled settings. The disabled setting allows for normal database access. A first enabled setting forces sample database access. A second enabled setting allows read-only access to productive data, such that modifying productive data results in sample data entries. Alternatively, the sample switch 174 may include an overlay setting that creates a sample entry with a key. Database access is allowed normally. Then, in response to some stimulus, such as the sample switch 174 being reset or a user logging off, database entries with the same key as the sample entry are deleted. In other alternative embodiments, sample switch settings may include some combination of read-only, write-only, and read-write access to portions (e.g., productive, sample, or other) of a database.

Advantageously, in an embodiment, programs may access the database 164 normally, but, by setting the switch, productive data can be protected during, for example, testing or demonstrating. The sample switch 174 may be implemented efficiently because, for example, turning a switch on or off takes relatively little effort. Moreover, a database interface (or API) may be implemented using, for example, Object-Oriented ABAP classes. So, a class that reads sample data may be a subclass of a database interface class and a factory method creates the instances of the database interface class or its subclass dependent on the sample data switch. In this way, the impact of setting the switch is minimal with respect to an application originating a database query. If access to a database is via a database view, the selection criteria of the view can be adopted in a similar manner.

Figure 5:
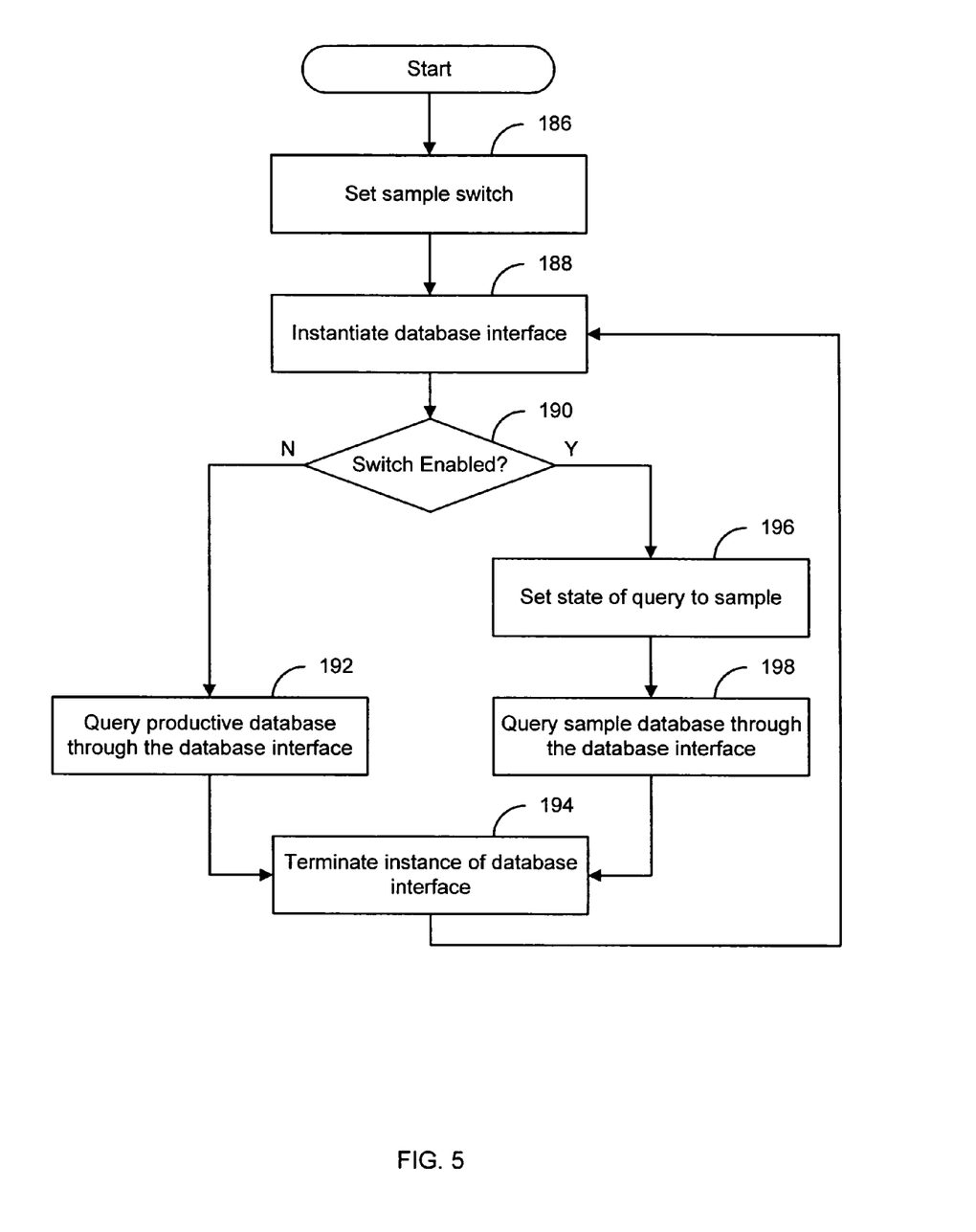
FIG. 5 depicts a flowchart of an exemplary method for database access.

Various methods may be used to access a database in accordance with a dynamic sample data switch. FIG. 5 depicts a flowchart of an exemplary method for accessing a database according to an embodiment. In this embodiment, the method starts at module 186 when a sample switch is set. Setting the sample switch may be accomplished when configuring a system for use. For example, if a system is to be used for demonstration, the sample switch may be enabled. If the system is to be used for productive database queries, the sample switch may be disabled. Alternatively, the sample switch may be set dynamically at run-time.

In this embodiment, the method continues at module 188 with instantiation of a database interface. Instantiating a database interface may be in response to receiving a request for database access from a remote or local computer program. Accordingly, the database interface may be instantiated dynamically at run-time. In an alternative embodiment, a remote or local computer program may instantiate the database interface directly. The request for database access may or may not include a state that is appropriate according to the sample switch. For example, if the database query is for active data when the sample switch is enabled, then the active data request is not appropriate. However, if the database query is for active data when the sample switch is disabled, then the active data request is appropriate.

In this embodiment, the method continues at module 190 with a determination of whether the sample switch is enabled. The determination may be made by checking an environment variable. The environment variable may be set by an administrator. The administrator may enable a sample switch by setting the environment variable accordingly.

If the sample switch is not enabled (190-N), then the method continues at module 192 when a productive database is queried via the database interface and the method continues at module 194 when the instance of the database interface is terminated. If, on the other hand, the sample switch is enabled (190-Y), then the method continues at module 196 when the state of the query is set to sample. It is assumed, for the purposes of example, that the state of the query is associated with productive data when the query is first received. At module 196, this state is changed such that the query becomes associated with sample data. The method then continues at module 198 when a sample database is queried via the database interface and continues at module 194 when the instance of the database interface is terminated. After module 194, the method continues from module 188. Alternatively, multiple queries could be made through a database interface, which may include repeating modules 192 or 198 (or modules 196 and 198). This method and other methods are depicted as serially arranged modules. However, modules of the methods may be reordered, or arranged for parallel execution as appropriate.

Figure 6:
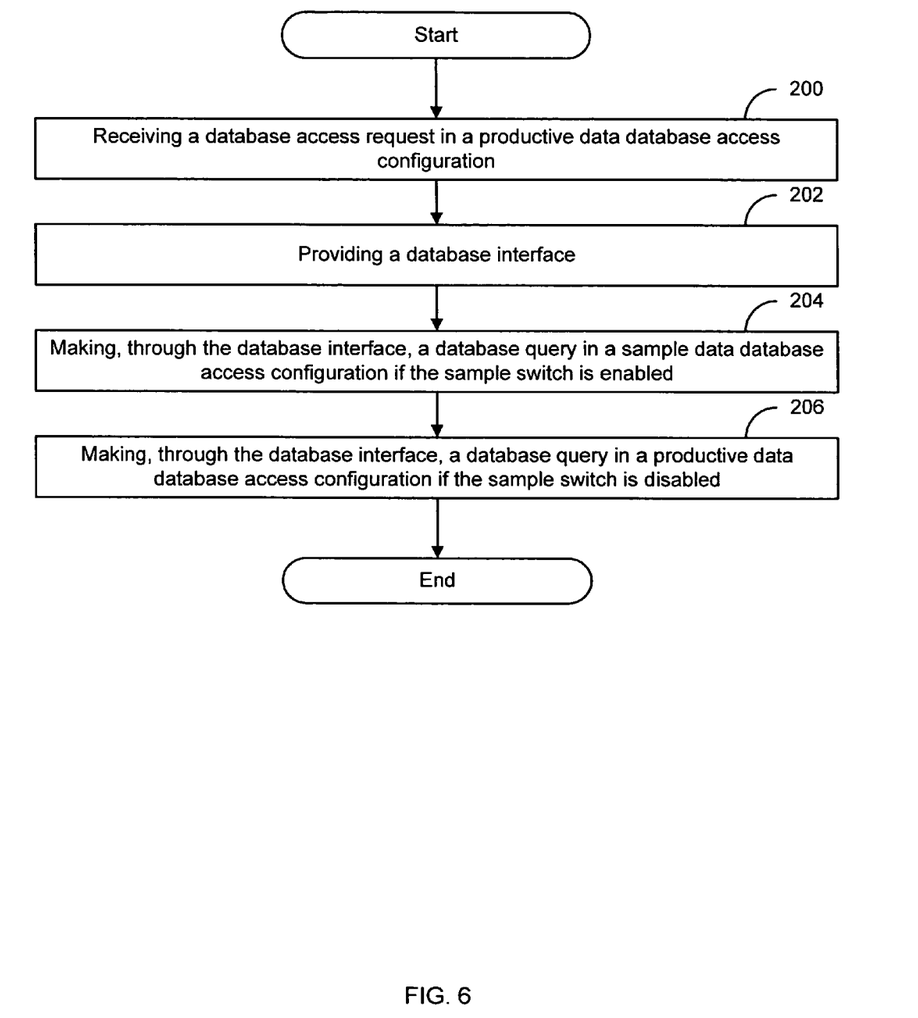
FIG. 6 depicts a flowchart of an alternative method for database access.

FIG. 6 depicts a flowchart of an alternative method for accessing a database according to an embodiment. The method begins at module 200 when a database access request is received in a productive data database access configuration. A requesting application may or may not be configured to make a database access request in a sample data database access configuration. Accordingly, any database request may be in the productive data database access configuration. This configuration may include a state flag that is set to, for example, 'A' for active data or 'I' for inactive data.

In this embodiment, the method continues at module 202 when a database interface is provided. The database interface may be instantiated by an object factory according to an environment variable.

In this embodiment, the method continues at module 204 with making, through the database interface, a database query in a sample data database access configuration if the sample switch is enabled. The sample data database access configuration may include a state flag that is set to, for example, 'S' for sample data. In an alternative embodiment, the state flag could be set to 'S' for active sample data and 's' for inactive sample data.

In this embodiment, the method ends at module 206 with making, through the database interface, a database query in a productive data database access configuration if the sample switch is disabled. The productive data database access configuration may or may not be the same as the database access request.

While this invention has been described in terms of certain exemplary embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention; the invention is limited only by the claims.

What is claimed is:

1. A database system, comprising:
storage for two classes of data: productive data representing data to be maintained during normal operation of the database system and sample data representing data to be used during administrative maintenance of the database system;
a database interface responsive to a database access request, to:
direct the database access request to the productive data when a sample switch value is set to a disabled setting,
direct the database access request to the sample data if the sample switch value is set to a first enabled setting, and
direct the database access request to productive data on a read only basis if the sample switch value is set to a second enabled setting.

2. The database system of claim 1, wherein the sample switch value is associated with a value of an environment variable.

3. The database system of claim 1, wherein said database interface is configured to receive a database access request from a program, modify the request, and forward the modified database access request to sample data when the sample switch is value is set to the first enabled setting.

4. The database system of claim 1, wherein:
if the sample switch value is set to the first enabled setting, the database interface creates an entry in the database having a sample data identifier, and directs the database access request to the created entry, and
upon resetting of the sample switch value from an enabled setting to a disabled setting, all entries in the database having the sample data identifier are deleted.

5. A computer-implemented method, comprising:
receiving a database access request for a productive data query to a database storing two classes of data: productive data representing data to be maintained during normal operation of the database system and sample data representing data to be used during administrative maintenance of the database system;
providing a database interface;
directing the database access request to the productive data when a sample switch value is set to a disabled setting;
directing the database access request to the sample data if the sample switch value is set to a first enabled setting; and
directing the database access request to productive data on a read only basis if the sample switch value is set to a second enabled setting.

6. The method of claim 5, further comprising setting the sample switch value according to the value of an environment variable.

7. The method of claim 6, further comprising producing a database interface without access to sample data if the environment variable is disabled.

8. The method of claim 6, further comprising instantiating the database interface according to the state of the environment variable.

9. The method of claim 5, further comprising modifying the database access request and forwarding the modified database access request to-a sample data when the sample switch value is set to the first enabled setting.

10. The method of claim 5, wherein sample data may have one of a plurality of sample states.

11. A database system, comprising:
storage for two classes of data: productive data representing data to be maintained during normal operation of the database system and sample data representing data to be used during administrative maintenance of the database system;
a sample switch that may be set to enabled or disabled;
a database interface responsive to a database access request, wherein
the database access request is directed to productive data and contains a state value identifying a state of data requested thereby, according to a protocol that defines a predetermined number of valid state values,
if the sample switch is enabled, the database interface resets the state value included in the database access request to a sample data state value which is not part of the protocol,
the database interface directs the database access request to a database for access to productive data if the requested state field is not set to a sample data state, and
the database interface redirects the database access request to a database for access to sample data if the requested state field is set to a sample data state.

* * * * *